US009994045B2

United States Patent
Sato et al.

(10) Patent No.: US 9,994,045 B2
(45) Date of Patent: Jun. 12, 2018

(54) LIGHT IRRADIATION APPARATUS INCLUDING A LIGHT SHIELD

(71) Applicant: Ushio Denki Kabushiki Kaisha, Tokyo (JP)

(72) Inventors: Takumi Sato, Tokyo (JP); Koji Enomoto, Tokyo (JP); Yoshihiro Kanahashi, Tokyo (JP); Yoshihisa Yokokawa, Tokyo (JP); Yoshio Okazaki, Tokyo (JP); Norihiro Sengoku, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/329,297

(22) PCT Filed: Jul. 30, 2015

(86) PCT No.: PCT/JP2015/071585
§ 371 (c)(1),
(2) Date: Jan. 26, 2017

(87) PCT Pub. No.: WO2016/017729
PCT Pub. Date: Feb. 4, 2016

(65) Prior Publication Data
US 2017/0217214 A1    Aug. 3, 2017

(30) Foreign Application Priority Data

Aug. 1, 2014 (JP) .................................. 2014-157729
Aug. 1, 2014 (JP) .................................. 2014-157730
Dec. 11, 2014 (JP) .................................. 2014-250657

(51) Int. Cl.
*B41J 11/00* (2006.01)
*G02B 3/06* (2006.01)
(Continued)

(52) U.S. Cl.
CPC ............. *B41J 11/0015* (2013.01); *B05C 9/12* (2013.01); *G02B 3/06* (2013.01); *G02B 7/02* (2013.01); *G02B 19/0028* (2013.01)

(58) Field of Classification Search
CPC .... B41J 11/0015; B05C 9/12; G02B 19/0028; G02B 3/06; G02B 7/02
See application file for complete search history.

(56) References Cited

U.S. PATENT DOCUMENTS

2013/0056767 A1*  3/2013  Tanaka ................ B41F 23/0453
                                                             257/89
2015/0158312 A1*  6/2015  Childers ................ B41J 11/002
                                                            347/102

FOREIGN PATENT DOCUMENTS

JP       2004-358769 A       12/2004
JP       2005-103854 A        4/2005
(Continued)

OTHER PUBLICATIONS

International Search Report issued in PCT/JP2015/071585; dated Oct. 6, 2015.
(Continued)

Primary Examiner — Bradley Thies
(74) Attorney, Agent, or Firm — Studebaker & Brackett PC

(57) ABSTRACT

Disclosed are a light irradiation apparatus that prevents or suppresses projection of light on adjoining other portions and can be miniaturized overall, and a photocurable material treatment apparatus that includes this light irradiation apparatus. The light irradiation apparatus includes: a light source having a plurality of light emitting elements arranged in the x direction; and an elongated cylindrical lens extending in the x direction along the light source unit. A light source reference plane that includes a center of a light emission surface of each light emitting element is located on a plane (Continued)

separated in the y direction from a lens reference plane that includes a center axis of the cylindrical lens. A direction of the light from the cylindrical lens is tilted in a direction away from the light source reference plane with respect to the lens reference plane

11 Claims, 12 Drawing Sheets

(51) Int. Cl.
  *G02B 7/02* (2006.01)
  *G02B 19/00* (2006.01)
  *B05C 9/12* (2006.01)

(56) References Cited

FOREIGN PATENT DOCUMENTS

| | | |
|---|---|---|
| JP | 2005-125753 A | 5/2005 |
| JP | 2006-159852 A | 6/2006 |
| JP | 2009-226692 A | 10/2009 |
| WO | 2008/029573 A1 | 3/2008 |
| WO | 2015/084943 A1 | 6/2015 |

OTHER PUBLICATIONS

Written Opinion issued in PCT/JP2015/071585; dated Oct. 6, 2015.
An Office Action; "Notification of Reasons for Refusal," issued by the Japanese Patent Office dated Jan. 9, 2018, which corresponds to Japanese Patent Application No. 2014-157730 and is related to U.S. Appl. No. 15/329,297; with English language translation.

* cited by examiner x DIRECTION

US 9,994,045 B2

LIGHT IRRADIATION APPARATUS INCLUDING A LIGHT SHIELD

TECHNICAL FIELD

The present invention relates to a light irradiation apparatus that is mounted on, for example, an inkjet printer, a 3D printer and the like, and a photocurable material treatment apparatus that includes this light irradiation apparatus.

BACKGROUND ART

Conventionally, in the fields of printing, electronic industry and the like, light irradiation apparatuses for radiating light of specific wavelengths have been heavily used to perform curing treatment, drying treatment, melting treatment, softening treatment, modification treatment or the like on objects to be treated, such as a protective film, an adhesive, paint, ink, photoresist, a resin and an alignment film.

For example, Patent Literature 1 discloses an inkjet printer that uses an ultraviolet-curable ink. This inkjet printer includes a head unit that ejects the ink, and a light irradiation apparatus that is installed next to this head unit. In such an inkjet printer, the head unit includes a plurality of discharge parts. Then, these discharge parts eject various types of ink (photocurable material) to a recording medium. The light irradiation apparatus then irradiates the ink ejected to the recording medium with light.

However, if the foregoing inkjet printer is used for a long period of time, the amounts of ink ejected from the discharge parts may become unstable. One of the reasons for the occurrence of such a phenomenon is that the discharge parts of the head unit are directly or indirectly irradiated with the light from the light irradiation apparatus disposed next to the head unit, so that the ink cures in the discharge parts and the cured products interfere with the ejection of the ink from the discharge parts.

In particular, optical fabrication apparatuses, typified by a 3D printer, form a three-dimensional structure on a surface to be irradiated. The resulting three-dimensional structure can thus reflect the light from the light irradiation apparatus, and the reflected light is likely to be projected on the discharge parts of the head unit. This results in a problem that the phenomenon is likely to occur in which the amounts of photocurable material ejected from the discharge parts become unstable.

To solve such a problem, Patent Literature 2 discloses an inkjet printer in which a light irradiation apparatus is separated from a head unit by a distance L and the light irradiation apparatus is obliquely disposed, whereby the projection of the light from the light irradiation apparatus upon the discharge parts of the head unit is suppressed.

However, such an inkjet printer has the problem that the entire apparatus becomes large in size since the light irradiation apparatus is separated from the head unit by a considerably large distance and is obliquely disposed.

CITATION LIST

Patent Literature

Patent Literature 1: Japanese Patent Application Laid-Open No. 2004-358769
Patent Literature 2: Japanese Patent Application Laid-Open No. 2009-226692

SUMMARY OF INVENTION

Technical Problem

The present invention has as its object the provision of a light irradiation apparatus that can prevent or suppress the projection of light on adjoining other portions and allows miniaturization of the entire apparatus, and the provision of a photocurable material treatment apparatus that includes this light irradiation apparatus.

Solution to Problem

According to the present invention, there is provided a light irradiation apparatus of a first invention, which includes, with three mutually orthogonal directions as an x direction, a y direction and a z direction:
a long light source unit in which a plurality of light emitting elements are disposed in a state of being arranged in the x direction along a plane extending in the x direction and the y direction; and
a cylindrical lens that has an elongated shape extending in the x direction along the light source unit, a longitudinal peripheral surface of the cylindrical lens including a light reception surface for receiving light from the light source unit and a light-exiting surface for allowing the received light to exit therethrough, wherein
with a plane that includes a center of a light emission surface of each of the light emitting elements and extends in the x direction and the z direction as a light source reference plane, and a plane that includes a center axis of the cylindrical lens and extends in the x direction and the z direction as a lens reference plane,
the light source unit is disposed so that the light source reference plane is located on a plane separated from the lens reference plane in the y direction, and
a direction of the light from the light-exiting surface of the cylindrical lens is tilted in a direction away from the light source reference plane with respect to the lens reference plane.

In the light irradiation apparatus of the first invention, alight shield that blocks the light from the light source unit may preferably be arranged in an area opposite from the lens reference plane with respect to the light source reference plane.

In such a light irradiation apparatus, an end portion of the light shield on a side of the lens reference plane may preferably be located in the light source reference plane or a plane separated from the light source reference plane to the side of the lens reference plane.

In the light irradiation apparatus of the first invention, each of the light emitting elements of the light source unit may preferably be provided with a sealing lens of semi-spherical shape that covers the light emission surface of the light emitting element, and center axes of the sealing lenses may preferably be located in a plane translated from the light source reference plane to the side of the lens reference plane.

According to the present invention, there is provided a light irradiation apparatus of a second invention, which includes, with three mutually orthogonal directions as an x direction, a y direction and a z direction:
a long light source unit in which a plurality of light emitting elements are disposed in a state of being arranged in the x direction along a plane extending in the x direction and the y direction;
a cylindrical lens that has an elongated shape extending in the x direction along the light source unit, a longitudinal peripheral surface of the cylindrical lens including a light reception surface for receiving light from the light source unit and a light-exiting surface for allowing the received light to exit therethrough; and a lens holding mechanism that includes a first holder and a second holder, and sandwiches the cylindrical lens between the first holder and the second holder, the light irradiation apparatus irradiating a surface to be irradiated extending in the x direction and the y direction with the light from the light-exiting surface of the cylindrical lens, wherein with a plane that includes a center axis of the cylindrical lens and extends in the x direction and the z direction as a lens reference plane, the first holder is arranged to make contact with a peripheral surface area of the cylindrical lens on one side of the lens reference plane, and the second holder is arranged to make contact with the peripheral surface area of the cylindrical lens on the other side of the lens reference plane, and in a cross section perpendicular to a longitudinal direction of the cylindrical lens, the first holder is disposed so that an angle α that a straight line connecting a position Q and a position T1 forms with the lens reference plane S is greater than an angle β that a straight line connecting the position Q and a position T2 forms with the lens reference plane S, where the position Q is a position of the center axis of the cylindrical lens, the position T1 is a position closest to the surface to be irradiated in the peripheral surface area of the cylindrical lens with which the first holder makes contact, and the position T2 is a position closest to the surface to be irradiated in the peripheral surface area of the cylindrical lens with which the second holder makes contact.

In the light irradiation apparatus of the second invention, centers of light emission surfaces of the light emitting elements in the light source unit may preferably be disposed on the other side of the lens reference plane.

A reflecting mirror that receives and reflects the light from the light source unit to the one side of the lens reference plane via the cylindrical lens may preferably be arranged on the other side of the lens reference plane of the cylindrical lens, along the longitudinal direction of the cylindrical lens.

The first holder may preferably make contact with a longitudinal end portion of the cylindrical lens.

The first holder and the second holder each may preferably include a sandwiching portion that makes contact with the cylindrical lens, and a portion to be supported that is connected to the sandwiching portion and extends in the x direction, and have a cantilever structure of being supported at one end of the portion to be supported.

A photocurable material treatment apparatus according to the present invention includes: a head unit that includes a discharge part for discharging a photocurable material; and the foregoing light irradiation apparatus that is arranged next to the head unit, wherein the light irradiation apparatus is disposed so that the light from the light-exiting surface of the cylindrical lens is projected on a position away from the head unit.

Advantageous Effects of Invention

According to the light irradiation apparatus of the first invention, the light source unit and the cylindrical lens are disposed in a specific positional relationship. The direction of the light from the light-exiting surface of the cylindrical lens is tilted in the direction away from the light source reference plane with respect to the lens reference plane. This can prevent or suppress the projection of the light on adjoining other portions. In addition, since the light irradiation apparatus does need to be disposed away from the adjoining other portions, the entire apparatus can be miniaturized.

According to the light irradiation apparatus of the second invention, the light is allowed to exit through the light-exiting surface of the cylindrical lens in a direction from the other side to the one side of the lens reference plane. The second holder blocks all or most of light other than that traveling from the other side to the one side of the lens reference plane. This can prevent or suppress the projection of the light on adjoining other portions. In addition, since the light irradiation apparatus does need to be disposed away from the adjoining other portions, the entire apparatus can be miniaturized.

DESCRIPTION OF EMBODIMENTS

Embodiments of the present invention will be described below.

Figure 1:
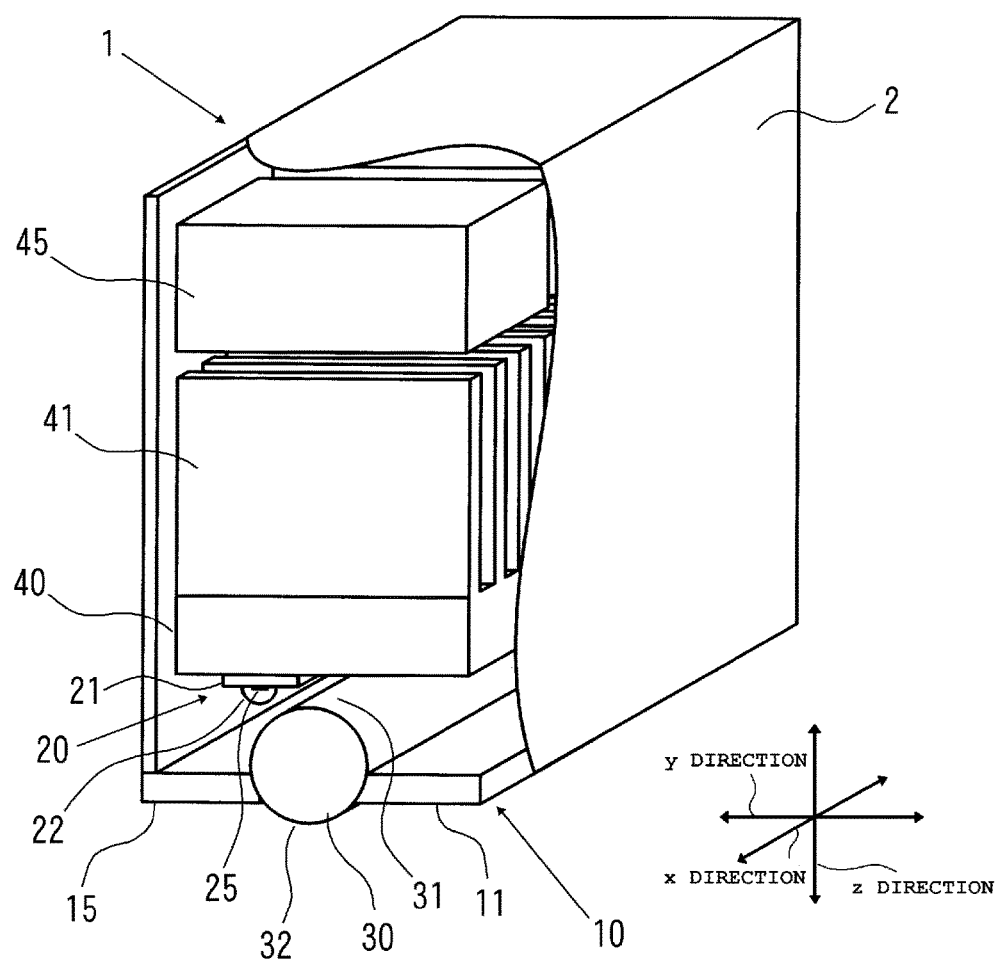
FIG. 1 is a perspective view illustrating a configuration of an example of a light irradiation apparatus according to a first invention, with a housing cut away.
Figure 2:
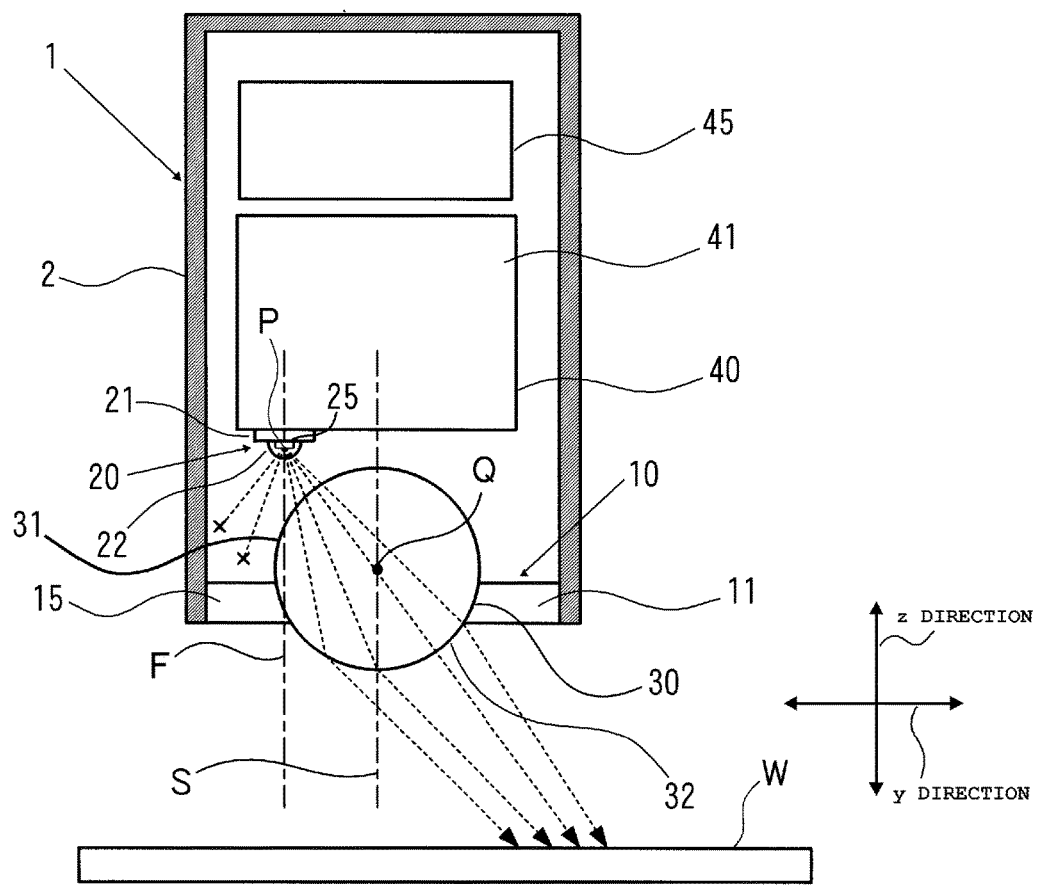
FIG. 2 is an explanatory diagram illustrating the configuration of the example of the light irradiation apparatus according to the first invention, with the housing cut away.

First Invention:

FIG. 1 is a perspective view illustrating a configuration of an example of a light irradiation apparatus according to a first invention, with a housing cut away. FIG. 2 is an explanatory diagram illustrating the configuration of the example of the light irradiation apparatus according to the first invention, with the housing cut away. In the diagrams, an x direction, a y direction and a z direction illustrated by respective arrows indicate three mutually orthogonal directions.

A light irradiation apparatus 1 according to this first invention includes a housing 2 of rectangular solid shape, having an opening in its lower surface. The housing 2 of the illustrated example is configured so that an upper surface and the lower surface are flat surfaces extending in the x direction (direction perpendicular to the plane of FIG. 2) and the y direction. Among the four side surfaces, two mutually-opposed side surfaces are flat surfaces extending in the x direction and the z direction. The other two mutually-opposed side surfaces are flat surfaces extending the y direction and the z direction.

Figure 3:
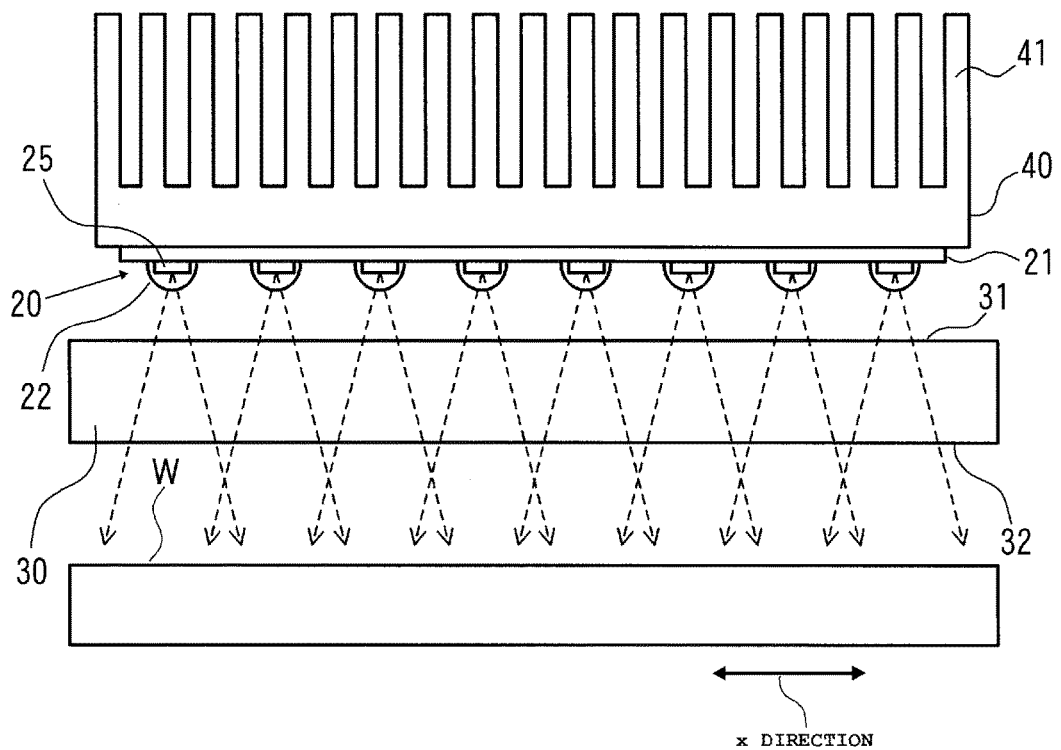
FIG. 3 is an explanatory diagram illustrating a light source unit, a cylindrical lens and a heat sink of the light irradiation apparatus illustrated in FIG. 1, as seen in a y direction.

Along light source unit 20 extending in the x direction is arranged inside the housing 2. A cylindrical lens 30 having an elongated shape extending along the light source unit 20 is arranged obliquely below the light source unit 20. A lens holding mechanism 10 including a first holder 11 and a second holder 15 each sandwiching the cylindrical lens 30 is arranged in the opening of the housing 2. A heat sink 40 made of, for example, aluminum is arranged on a top surface of the light source unit 20. As also illustrated in FIG. 3, a plurality of fins 41 each protruding upward are formed on this heat sink 40. A cooling fan 45 is arranged above the heat sink 40.

The light source unit 20 includes a long rectangular substrate 21. This substrate 21 is disposed to extend in the x direction, along a plane extending in the x direction and the y direction. A plurality of light emitting elements 25 of rectangular plate shape are disposed on the surface (lower surface in FIG. 2) of the substrate 21 in a state of being arranged in the x direction along the surface of the substrate 21, i.e., a flat surface extending in the x direction and the y direction. Each of the light emitting elements 25 is provided with a semispherical sealing lens 22 that covers a light emission surface of the light emitting element 25. The sealing lens 22 is arranged to protrude from the surface of the substrate 21. Further, the light source unit 20 is disposed with the light emission surfaces of the light emitting elements 25 facing downward.

Materials that constitute the substrate 21 of the light source unit 20 may include ceramic materials such as aluminum nitride and alumina ceramics, and composite resin materials such as a glass fiber-reinforced epoxy resin.

Materials that constitute the sealing lenses 22 may include glass materials such as quartz glass and borosilicate glass, and translucent resin materials such as a silicone resin, an acrylic resin and an epoxy resin.

For the light emitting elements 25, light-emitting diodes that emit needed light, such as ultraviolet rays, may be used.

The cylindrical lens 30 of this example has a circular cross section perpendicular to its longitudinal direction. The cylindrical lens 30 has a light reception surface 31 for receiving light from the light source 20 in an area of its longitudinal (x direction) peripheral surface opposed to the light source unit 20, and a light-exiting surface 32 for allowing the received light to exit therethrough in an area of the peripheral surface opposite from the light reception surface 31. The illustrated cylindrical lens 30 has the light reception surface 31 in the area exposed upward from the first holder 11 and the second holder 15 to be described later, and the light-exiting surface 32 in the area exposed downward from the first holder 11 and the second holder 15. The cylindrical lens 30 is disposed so that the light-exiting surface 32 faces a surface to be irradiated W that extends in the x direction and the y direction.

Materials that constitute the cylindrical lens 30 may include glass materials such as quartz glass and borosilicate glass.

The first holder 11 and the second holder 15 of the lens holding mechanism 10 each have a long plate-like shape extending along the cylindrical lens 30, and are disposed so that their respective longitudinal (x direction) one side surfaces are separated from and opposed to each other. In the illustrated example, the mutually-opposed respective side surfaces of the first holder 11 and the second holder 15 are curved surfaces conforming to a part of the longitudinal peripheral surface of the cylindrical lens 30. Thus, the cylindrical lens 30 is sandwiched between the respective side surfaces of the first holder 11 and the second holder 15.

In the light irradiation apparatus 1 of the first invention, the light source unit 20 is disposed so that a light source reference plane F is located on a plane separated from a lens reference plane S in the y direction. Here, the light source reference plane F is a plane that includes centers P of the light emission surfaces of the respective light emitting elements 25 and extends in the x direction and the z direction. The lens reference plane S is a plane that includes a center axis Q of the cylindrical lens 30 and extends in the x direction and the z direction. The second holder 15 in this example has a function as a light shield that blocks the light from the light source unit 20. To be more specific, the second holder 15 is arranged in an area opposite from the lens reference plane S with respect to the light source reference plane F. The second holder 15 is also disposed so that its end portion on the side of the lens reference plane S in the y direction is located on the light source reference plane F or a plane separated from the light source reference plane F to the side of the lens reference plane S. Among the rays of light radiated from the light source unit 20, light traveling along the light source reference plane F and light traveling in directions away from the lens reference plane S are then blocked by the second holder 15 serving as the light shield. As a result, the light from the light-exiting surface 32 of the cylindrical lens 30 is allowed to exit in an oblique direction away from the light source reference plane F with respect to the z direction. Thus, the light from the light-exiting surface 32 of the cylindrical lens 30 is projected on the surface to be irradiated W that extends in the x direction and the y direction.

In the foregoing description, the separation distance between the light source reference plane F and the lens reference plane S is set as appropriate according to the shapes and dimensions of the cylindrical lens 30, the second holder 15 serving as the light shield, and the like. The separation distance may preferably be 0.3 to 1.5 times the distance from the center axis Q of the cylindrical lens 30 to the peripheral surface on the side of the light source reference plane F in the y direction (in the illustrated example, the radius of the cylindrical lens 30).

A straight line that connects the center P of the light emission surface of a light emitting element 25 and the center axis Q of the cylindrical lens 30 in the shortest distance forms an angle of, for example, 10° to 60° with respect to the lens reference plane S.

According to such a light irradiation apparatus 1, the light source unit 20 and the cylindrical lens 30 are disposed in a specific positional relationship. The direction of the light from the light-exiting surface 32 of the cylindrical lens 30 is tilted in a direction away from the light source reference plane S with respect to the z direction. This can prevent or suppress the direct or indirect irradiation of other portions adjoining on one side (in FIG. 2, the left side) with the light. In addition, since the light irradiation apparatus 1 does not need to be disposed at a large distance from the adjoining other portions, the entire apparatus can be miniaturized.

Figure 4:
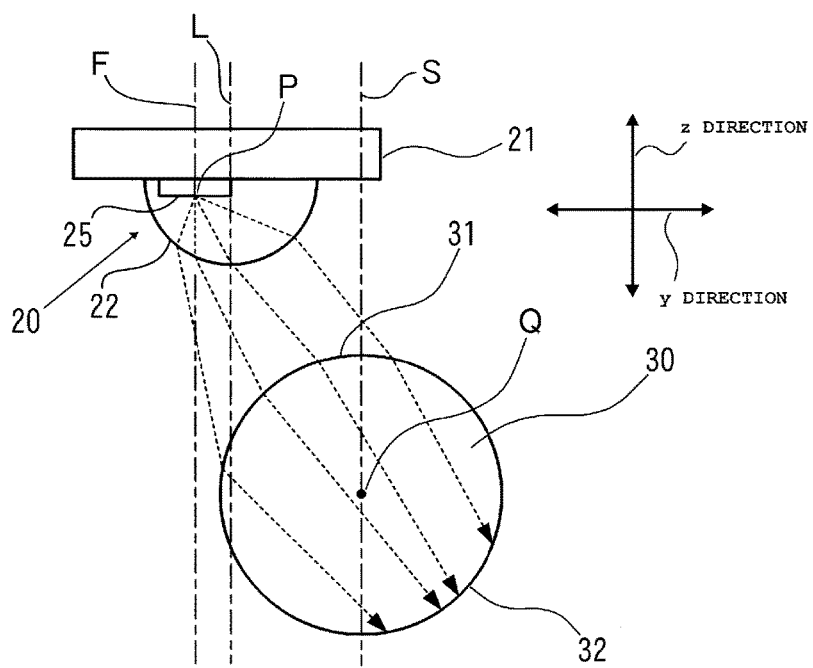
FIG. 4 is an explanatory diagram illustrating a configuration of essential parts according to another example of the light irradiation apparatus of the first invention.

FIG. 4 is an explanatory diagram illustrating a configuration of essential parts according to another example of the light irradiation apparatus of the first invention. In the light source unit 20 of this light irradiation apparatus, the sealing lenses 22 arranged on the respective light emitting elements 25 are each formed so that their center axis L is located within a plane that is translated from the light source reference plane F to the side of the lens reference plane S. The rest of the configuration is the same as that of the light irradiation apparatus illustrated in FIGS. 1 and 2.

The separation distance between the center axes L of the sealing lenses 22 and the light source reference plane F is set arbitrarily according to the dimensions of the light emitting elements 25 and the sealing lenses 22. The separation distance may preferably be 0.3 to 0.7 times the radius of the sealing lenses 22.

According to such a light irradiation apparatus, the same effects as those of the light irradiation apparatus illustrated in FIGS. 1 and 2 are obtained.

In this light irradiation apparatus, the center axes L of the sealing lenses 22 are located within the plane translated from the light source reference plane F to the side of the lens reference plane S. As a result, the light traveling from the light emitting elements 25 along the light source reference plane F and part of the light traveling in directions away from the lens reference plane S with respect to the light source reference plane F are refracted at the surfaces of the sealing lenses 22 into directions from the light source reference plane F toward the lens reference plane S. This can reduce the amount of light blocked by the light shield among the rays of light radiated from the light source unit 20. The use efficiency of the light can thus be improved.

The light irradiation apparatus according to the first invention is not limited to the foregoing embodiment, and the following various modifications may be made thereto.

(1) For the first holder 11, for example, one configured to sandwich the cylindrical lens 30 at both longitudinal ends may be used instead of the one having the elongated shape extending along the cylindrical lens 30.

Figure 5:
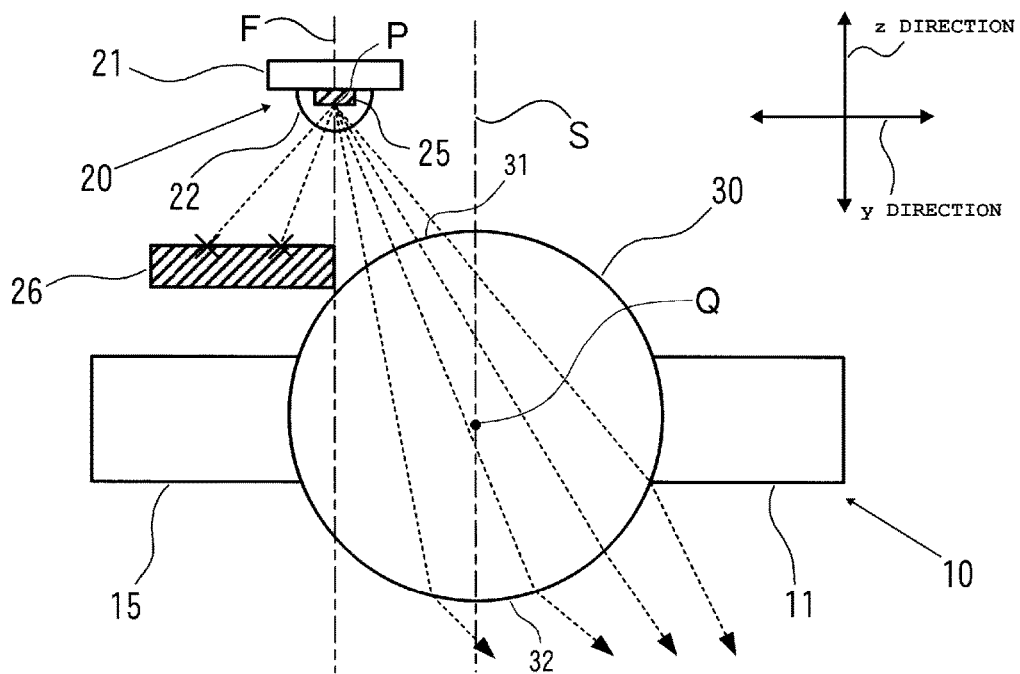
FIG. 5 is an explanatory diagram illustrating a configuration of the light irradiation apparatus according to the first embodiment, in which a light shield separate from a second holder is provided.

(2) As illustrated in FIG. 5, a long light shield 26 extending in the x direction (direction perpendicular to the plane of FIG. 5) may be arranged in an area opposite from the lens reference plane S with respect to the light source reference plane F, aside from the second holder 15. If such a light shield 26 is provided, the second holder 15 does not need to have the function as the light shield 26. The second holder 15 may therefore be one configured to sandwich the cylindrical lens 30 at both longitudinal ends.

Figure 6:
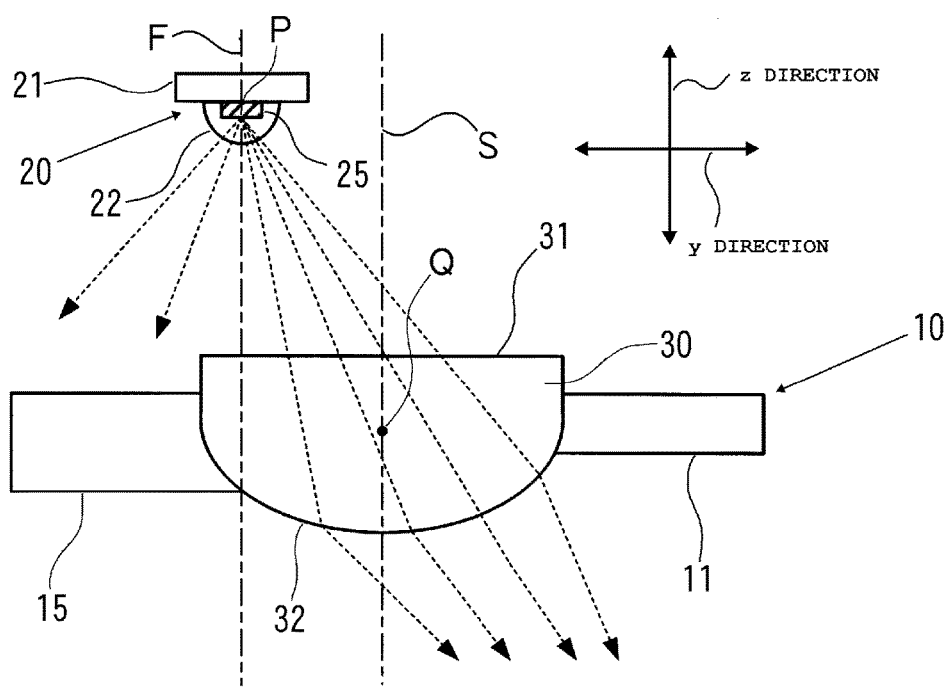
FIG. 6 is an explanatory diagram illustrating a modification of the cylindrical lens of the light irradiation apparatus according to the first invention.
Figure 7:
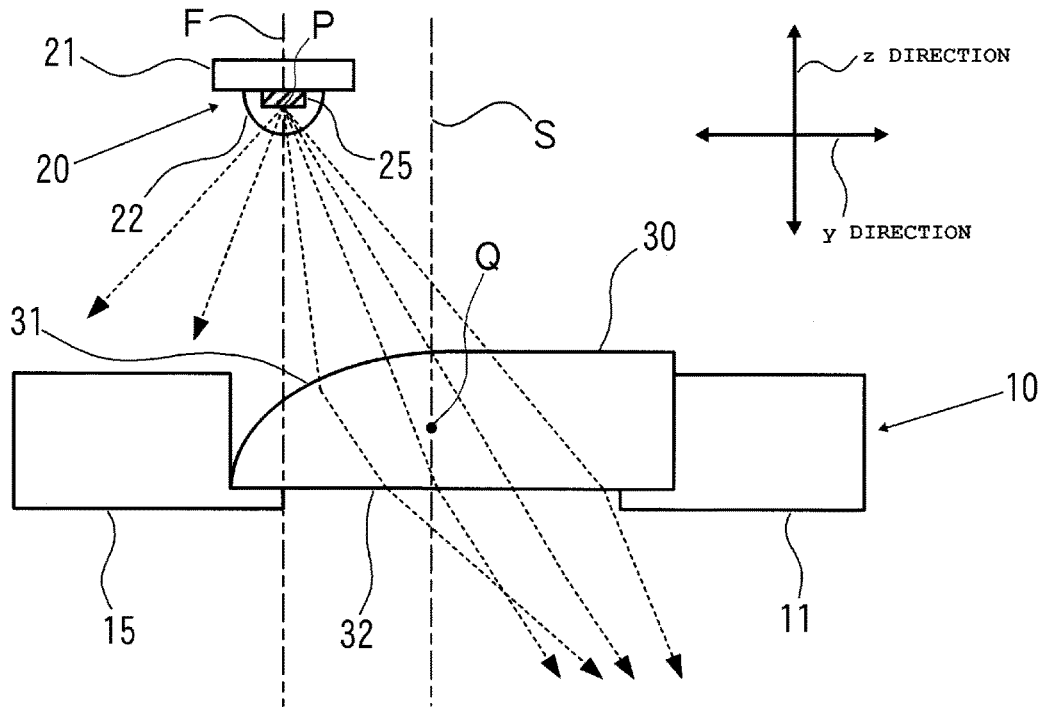
FIG. 7 is an explanatory diagram illustrating another modification of the cylindrical lens of the light irradiation apparatus according to the first invention.

(3) The cylindrical lens 30 is not limited to the one having a circular cross section, and ones having various shapes may be used. Specifically, the cylindrical lens 30 may preferably refract the light into directions away from the light source reference plane F at the light reception surface 31 and the light-exiting surface 32. For example, as illustrated in FIG. 6, one formed to have a flat light reception surface 31 and a convex light-exiting surface 32 may be used. As illustrated in FIG. 7, one formed to have a partially convex light reception surface 31 and a flat light-exiting surface 32 may be used.

Figure 8:
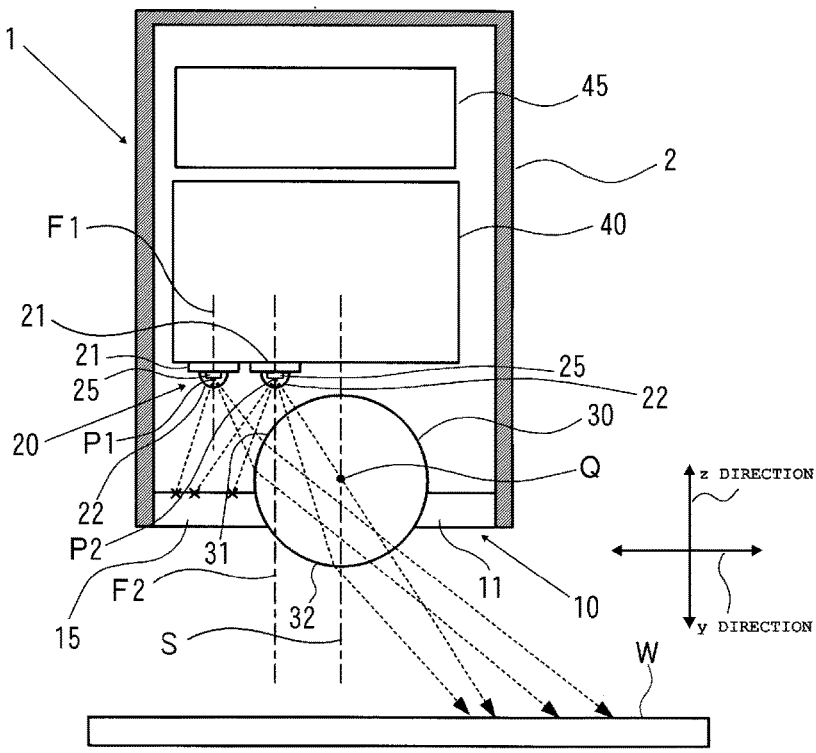
FIG. 8 is an explanatory cross-sectional view illustrating a configuration of the light irradiation apparatus according to the first invention, including a light source unit in which a plurality of light emitting elements are disposed on the surface of each of two substrates in a state of being arranged in an x direction along the surface of the substrate.

(4) As illustrated in FIG. 8, the light source unit 20 may include two substrates 21 each extending in the x direction (direction perpendicular to the plane of FIG. 8). A plurality of light emitting elements 25 are disposed on the surface of each of the substrates 21 in a state of being arranged in the x direction along the surface of the substrate 21. If the light source unit 20 having such a configuration is used, a light source reference plane F1 that includes centers P1 of the light emission surfaces of the respective light emitting elements 25 disposed on one of the substrates 21 and extends in the x direction and the z direction and a light source reference plane F2 that includes centers P2 of the light emission surfaces of the respective light emitting elements disposed on the other substrate 21 and extends in the x direction and the z direction may be each disposed to be located on a plane separated in the y direction from the lens reference plane S that includes the center axis Q of the cylindrical lens 30 and extends in the x direction and the z direction.

Figure 9:
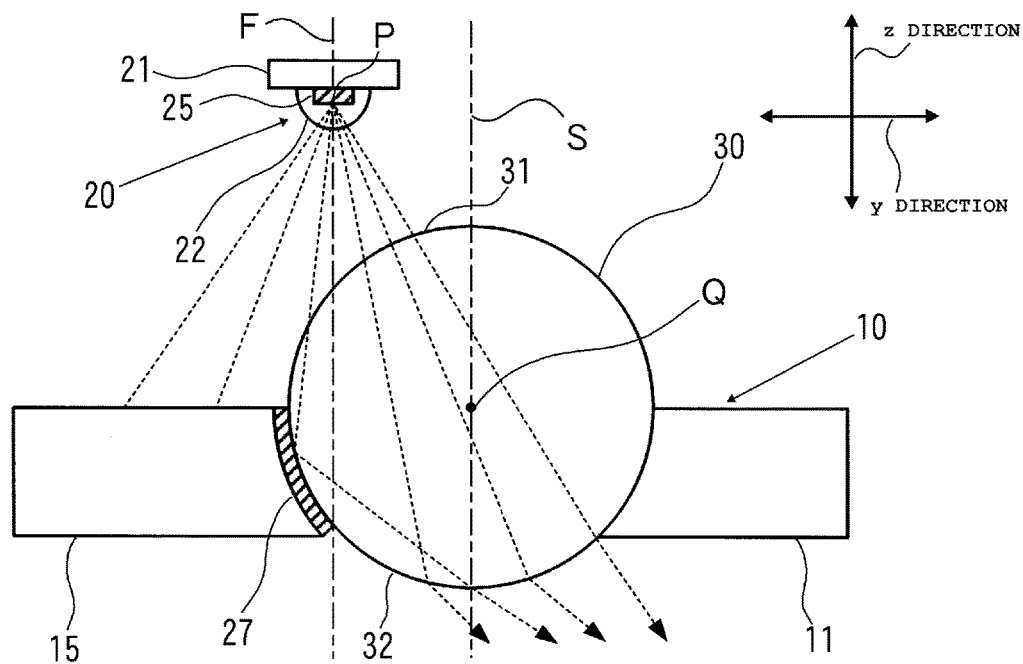
FIG. 9 is an explanatory diagram illustrating a configuration of the light irradiation apparatus according to the first invention, in which a light reflection member is formed on a side surface of the second holder.

(5) As illustrated in FIG. 9, a light reflection member 27 may be arranged between one side surface of the second holder 15 and the peripheral surface of the cylindrical lens 30. This light reflection member 27 may be fixed to the one side surface of the second holder 15 or fixed to the peripheral surface of the cylindrical lens 30. Materials that constitute the light reflection member 27 may include a metal multi-layer film deposited on the surface of the metal, such as aluminum, that constitutes the second holder 15, and a fluorine resin such as polytetrafluoroethylene. According to such a configuration, the light reflected by the light reflection member 27 travels in an oblique direction away from the light source reference plane F with respect to the lens reference plane S. The use efficiency of the light can thus be improved.

Figure 10:
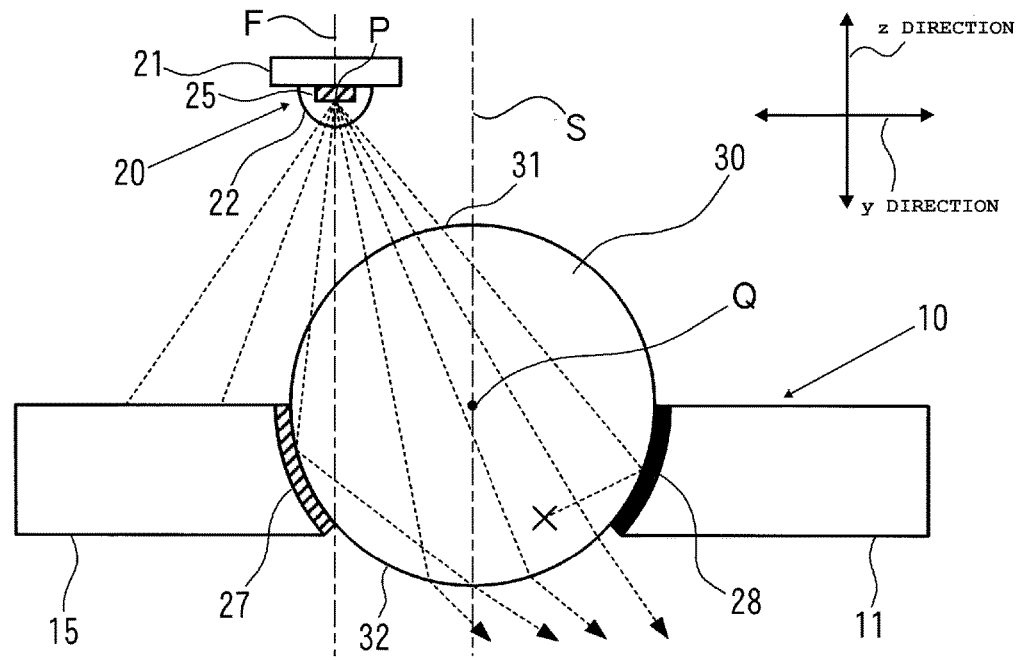
FIG. 10 is an explanatory diagram illustrating a configuration of the light irradiation apparatus according to the first invention, in which a light absorption member is formed on a side surface of a first holder.

(6) As illustrated in FIG. 10, a light absorption member 28 may be formed between one side surface of the first holder 11 and the peripheral surface of the cylindrical lens 30. The light absorption member 28 may be fixed to the one side surface of the first holder 11 or fixed to the peripheral surface of the cylindrical lens 30. Materials that constitute the light absorption member 28 may include a black alumite-treated surface of the metal, such as aluminum, that constitutes the first holder 11, and a fluorine resin such as blackened polytetrafluoroethylene.

According to such a configuration, the light from the cylindrical lens 30 will not be reflected by the one side surface of the first holder 11. This can prevent light traveling in a direction tilted toward the light source reference plane F with respect to the lens reference plane S from exiting through the light-exiting surface 32 of the cylindrical lens 30.

Figure 11:
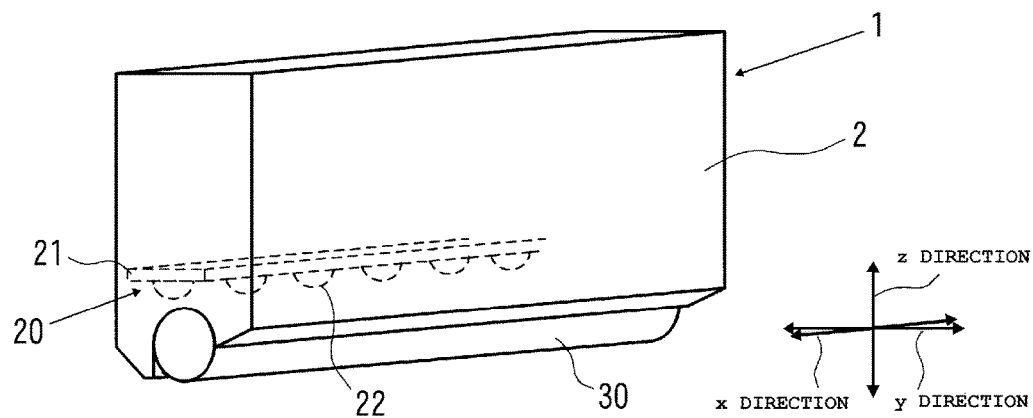
FIG. 11 is a perspective view illustrating an appearance of a light irradiation apparatus according to a first embodiment of a second invention.
Figure 12:
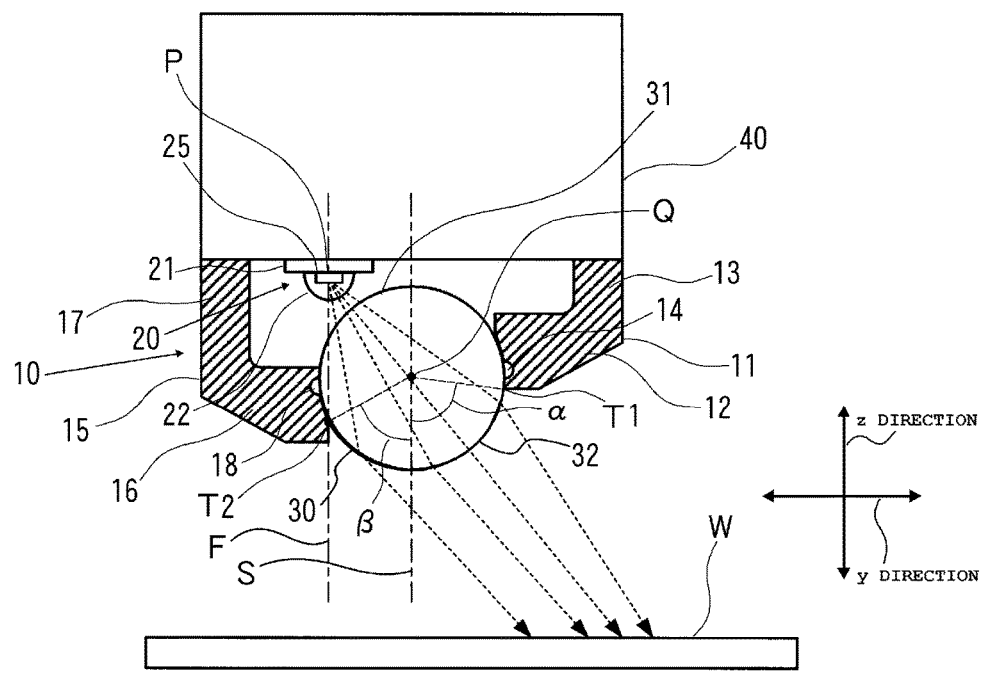
FIG. 12 is an explanatory cross-sectional view illustrating a configuration inside a housing of the light irradiation apparatus illustrated in FIG. 11.

Second Invention:

FIG. 11 is a perspective view illustrating an appearance of a light irradiation apparatus according to a first embodiment of a second invention. FIG. 12 is an explanatory diagram illustrating a configuration inside a housing of the light irradiation apparatus illustrated in FIG. 11. In the diagrams, an x direction, a y direction and a z direction indicated by respective arrows are three mutually orthogonal directions.

A housing 2 of this light irradiation apparatus 1 is configured so that an upper surface is a flat surface extending in the x direction (direction perpendicular to the plane of FIG. 12) and the y direction. Among the four side surfaces, two mutually-opposed side surfaces are flat surface extending in the x direction and the z direction. The other two mutually-opposed side surfaces are flat surfaces extending in the y direction and the z direction. An opening for exposing a light-exiting surface of a cylindrical lens 30 to be described below is formed in a lower surface of the housing 2.

Along light source unit 20 extending in the x direction is arranged inside the housing 2. A cylindrical lens 30 having an elongated shape extending along the light source unit 20 is arranged obliquely below the light source unit 20. In the light irradiation apparatus 1 of this example, the light source unit 20 and the cylindrical lens 30 have the same configuration as that of the light source unit 20 and the cylindrical lens 30 (see FIG. 3) in the light irradiation apparatus 1 illustrated in FIG. 1. A heat sink 40 made of, for example, aluminum is arranged on the upper surface of the light source unit 20. A plurality of fins (not illustrated) each protruding upward are formed on this heat sink 40. A cooling fan 41 (see FIG. 3) is arranged above the heat sink 40. A lens holding mechanism 10 for sandwiching the cylindrical lens 30 is arranged on the lower surface of the heat sink 40.

The lens holding mechanism 10 includes a first holder 11 and a second holder 15. Assuming that a plane that includes the center axis of the cylindrical lens 30 and extends in the x direction and the z direction as a lens reference plane S, the first holder 11 is arranged to make contact with a peripheral surface area of the cylindrical lens 30 on one side (in FIG. 12, the right side) of the lens reference plane S. The second holder 15 is arranged to make contact with a peripheral surface area of the cylindrical lens 30 on the other side (in FIG. 12, the left side) of the lens reference plane S.

Figure 13:
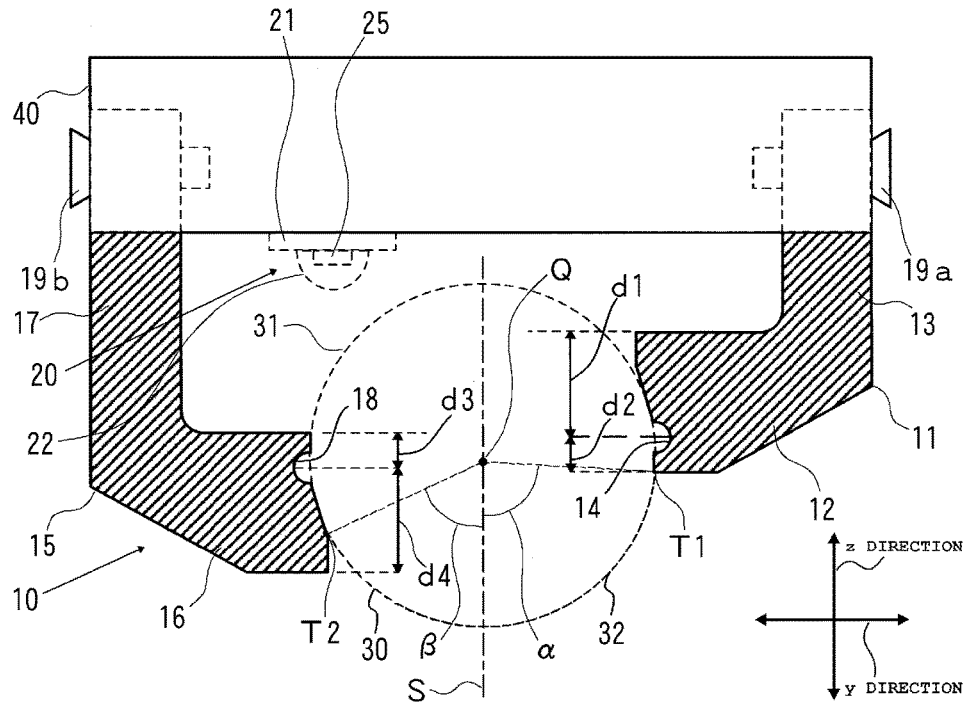
FIG. 13 is an enlarged explanatory cross-sectional view illustrating a lens holding mechanism of the light irradiation apparatus illustrated in FIG. 11.

As illustrated in FIG. 13, the first holder 11 and the second holder 15 have respective sandwiching portions 12 and 16 that extend in the x direction (direction perpendicular to the plane of FIG. 13) along the cylindrical lens 30 and make contact with the cylindrical lens 30. Portions to be supported 13 and 17 extending in the x direction are connected to the sandwiching portions 12 and 16, respectively. The first holder 11 and the second holder 15 each have a cantilever structure of being supported by the heat sink 40 at one end of the portion to be supported 13 or 17. In the illustrated example, the portions to be supported 13 and 17 of the first holder 11 and the second holder 15 are fixed by bolts 19a and 19b at one end, respectively.

Grooves 14 and 18 extending in the x direction are formed in the surfaces of the sandwiching portions 12 and 16 of the first holder 11 and the second folder 15, the surfaces making contact with the cylindrical lens 30 (hereinafter, referred to as "contact surfaces"). The sandwiching portion 12 of the first holder 11 is configured so that a thickness d1 from the center position of the bottom of the groove 14 in a direction away from a surface to be irradiated is greater than a thickness d2 from the center position of the bottom of the groove 14 in a direction toward the surface to be irradiated. On the other hand, the sandwiching portion 16 of the second holder 15 is configured so that a thickness d3 from the center position of the bottom of the groove 18 in the direction away from the surface to be irradiated is smaller than a thickness d4 from the center position of the bottom of the groove 18 in the direction toward the surface to be irradiated.

The second holder 15 is disposed to block light other than that traveling from the other side of the lens reference plane S toward the one side of the lens reference plane S among the rays of light from the light source unit 20. To be more specific, assuming that a plane that includes the centers P of the light emission surfaces of the light emitting elements 25 and extends in the x direction and the z direction as a light source reference plane F, the light source unit 20 is disposed so that the light source reference plane F is located on a plane separated from the lens reference plane S to the other side. In a cross section perpendicular to the longitudinal direction (x direction) of the cylindrical lens 30 (hereinafter, may be referred to as a "yz cross section"), the second holder 15 is disposed so that a position T2 is located on the light source reference plane F or a plane closer to the lens reference plane S than the light source reference plane F. Here, the position T2 is a position closest to the surface to be irradiated W in the peripheral surface area of the cylindrical lens 30 with which the second holder 15 makes contact. As a result, among the rays of light radiated from the light source unit 20, the light traveling along the light source reference plane F and the light traveling in directions away from the lens reference plane S are blocked by the second holder 15.

In the foregoing description, the separation distance between the light source reference plane F and the lens reference plane S is set as appropriate according to the shapes and dimensions of the cylindrical lens 30, the second holder 15 and the like. The separation distance may preferably be 0.3 to 1.5 times the distance from the center axis Q of the cylindrical lens 30 to the peripheral surface on the other side in the y direction (in the illustrated example, the radius of the cylindrical lens 30).

A straight line that connects the center P of the light emission surface of a light emitting element 25 and the center axis Q of the cylindrical lens 30 in the shortest distance forms an angle of, for example, 10° to 60° with respect to the lens reference plane S.

The entire contact surfaces of the first holder 11 and the second holder 15 do not need to make contact with the cylindrical lens 30. For example, in the yz cross section, the contact surfaces may each make contact at two points or more.

The first holder 11 is disposed so that, in the yz cross section, an angle α that a straight line connecting a position Q and a position T1 forms with the lens reference plane S is greater than an angle β that a straight line connecting the position Q and the position T2 forms with the lens reference plane S. Here, the position Q refers to the position of the center axis of the cylindrical lens 30. The position T1 is a position closest to the surface to be irradiated W in the peripheral surface area of the cylindrical lens 30 with which the first holder 11 makes contact. The position T2 is the position closest to the surface to be irradiated W in the peripheral surface area of the cylindrical lens 30 with which the second holder 15 makes contact.

In the illustrated example, the sandwiching portions 12 and 16 of the first holder 11 and the second holder 15 have the same thickness in the z direction. The portion to be supported 13 of the first holder 11 has a smaller size than that of the portion to be supported 17 of the second holder 15 in the z direction. The sandwiching portion 12 of the first holder 11 is thus disposed in a position more separated from the surface to be irradiated W in the z direction than the sandwiching portion 16 of the second holder 15 is. Consequently, the first holder 11 is disposed so that the formed angle α is greater than the formed angle β.

In the foregoing description, the formed angle α may preferably be 70° to 90°. A difference between the formed angle α and the formed angle β may preferably be 25° to 80°.

According to such a light irradiation apparatus 1, the first holder 11 is disposed so that the formed angle α is greater than the formed angle β. As a result, light is allowed to exit through the light-exiting surface 32 of the cylindrical lens 30 in a direction from the other side to the one side of the lens reference plane S. The second holder 15 blocks all or most of the light other than that traveling from the other side to the one side of the lens reference plane S. This can prevent or suppress the projection of light on other portions adjoining on the other side of the lens reference plane S. In addition, since the light irradiation apparatus 1 does not need to be disposed away from the adjoining other portions, the entire apparatus can be miniaturized.

Moreover, the amount of light blocked by the first holder 11 among the rays of light radiated from the light source unit 20 can be reduced. The use efficiency of the light can thus be improved.

Since the first holder 11 and the second holder 15 have the cantilever structure of being supported at one end of the portion to be supported 13 or 17, the cylindrical lens 30 is held by the respective free ends of the first holder 11 and the second holder 15. This allows adjustments to the amounts of warpage of the portions to be supported 13 and 17. Thus, a positional deviation, if any, of the center axis of the cylindrical lens 30 can be easily adjusted.

To be more specific, the positions of the end portions of the first holder 11 and the second holder 15 can be adjusted by the numbers of turns, tightening and the like of members that fix the holders to the heat sink 40, such as the bolts 19a and 19b. The positions of the end portions of the first holder 11 and the second holder 15 can thus be adjusted to adjust the position of the cylindrical lens 30.

The cylindrical lens 30 is sandwiched and held with two contact lines on one side, above and below the groove 18 formed in the sandwiching portion 16. This can further suppress a positional deviation of the center axis of the cylindrical lens 30.

Figure 14:
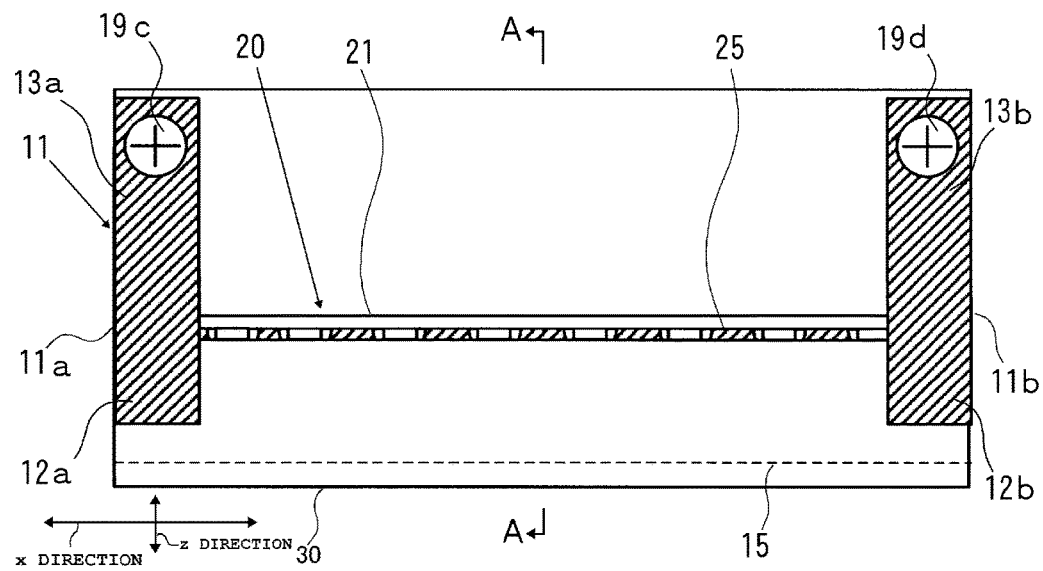
FIG. 14 is an explanatory diagram illustrating an internal configuration of a light irradiation apparatus according to a second embodiment of the second invention.
Figure 15:
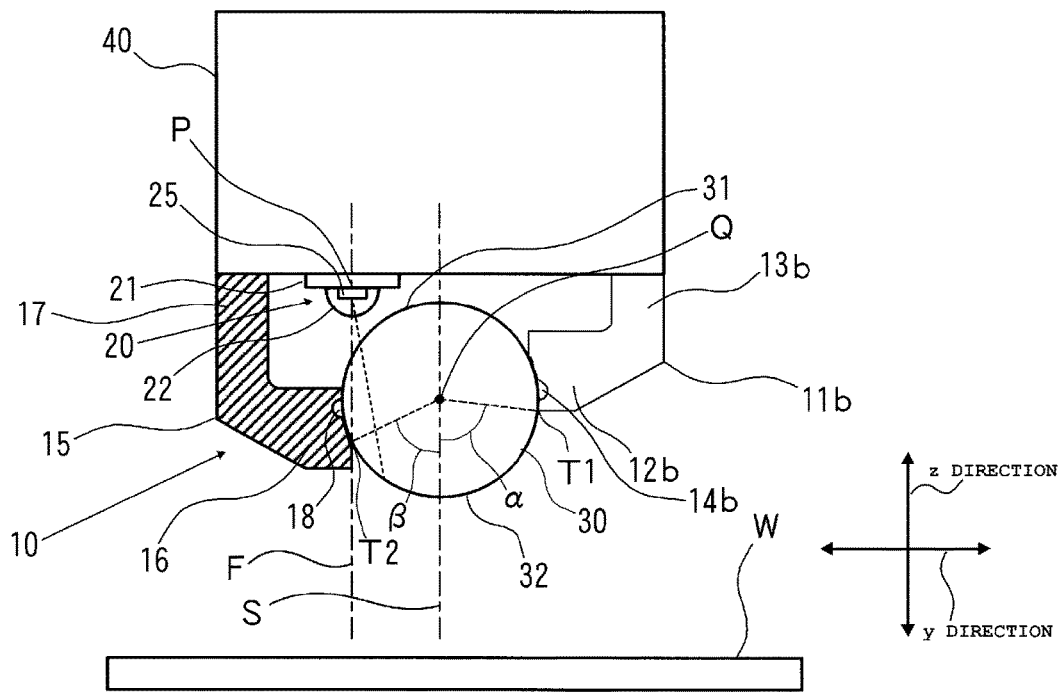
FIG. 15 is a cross-sectional view of the light irradiation apparatus illustrated in FIG. 14, taken along the line A-A.

FIG. 14 is an explanatory diagram illustrating an internal configuration of a light irradiation apparatus according to a second embodiment of the second invention. FIG. 15 is a cross-sectional view of the light irradiation apparatus illustrated in FIG. 14, taken along the line A-A. A first holder 11 of a lens holding mechanism 10 of this light irradiation apparatus includes two holding members 11a and 11b that sandwich a cylindrical lens 30 at both ends in a longitudinal direction (x direction) thereof. One of the holding members, 11a, includes a sandwiching portion 12a that makes contact with one end portion of the cylindrical lens 30, and a portion to be supported 13a that is connected to the sandwiching portion 12a. The other holding member 11b includes a sandwiching portion 12b that makes contact with the other end portion of the cylindrical lens 30, and a portion to be supported 13b that is connected to the sandwiching portion 12b. A groove (not illustrated) extending in the x direction is formed in a contact surface of the sandwiching portion 12a of the one holding member 11a. A groove 14b extending in the x direction is formed in a contact surface of the sandwiching portion 12b of the other holding member 11b. The portions to be supported 13a and 13b are fixed to a heat sink 40 by bolts 19c and 19b. The rest of the configuration of the light irradiation apparatus is the same as that of the light irradiation apparatus illustrated in FIGS. 11 and 12.

According to such a light irradiation apparatus, the same effects as those of the light irradiation apparatus illustrated in FIGS. 11 and 12 can be obtained.

Since the first holder 11 is configured to make contact with both longitudinal end portions of the cylindrical lens 30, the amount of light blocked by the first holder 11 among the rays of light radiated from the light source unit 20 can be reduced. The use efficiency of the light can thus be improved.

Figure 16:
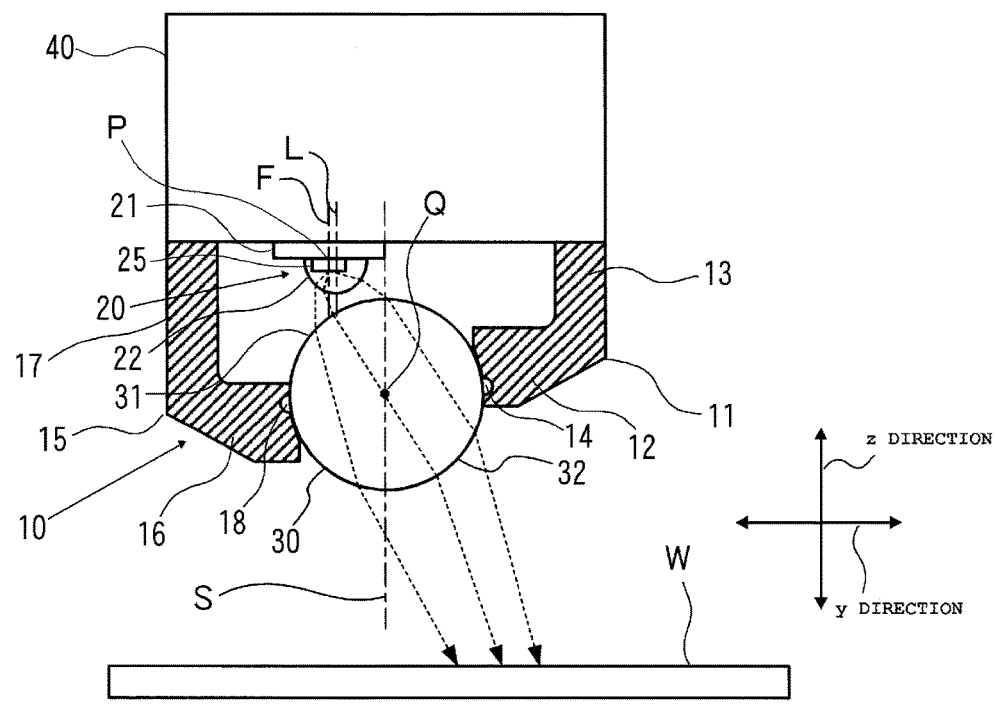
FIG. 16 is an explanatory diagram illustrating an internal configuration of a light irradiation apparatus according to a third embodiment of the second invention.

FIG. 16 is an explanatory diagram illustrating an internal configuration of a light irradiation apparatus according to a third embodiment of the second invention. Sealing lenses 22 arranged on respective light emitting elements 25 of a light source unit 20 of this light irradiation apparatus are each formed so that their center axis L is located within a plane that is translated from a light source reference plane F to the side of a lens reference plane S. In other words, the center axes L of the respective sealing lenses 22 are offset to the side of the lens reference plane S so that the center axes L lie in positions different from that of the light source reference plane F of the respective corresponding light emitting elements 25. The rest of the configuration of this light irradiation apparatus is the same as that of the light irradiation apparatus illustrated in FIGS. 11 and 12.

The separation distance between the center axes L of the sealing lenses 22 and the light source reference plane F is set as appropriate according to the dimensions of the light emitting elements 25 and the sealing lenses 22. The separation distance may preferably be 0.3 to 0.7 times the radius of the sealing lenses 22.

According to such a light irradiation apparatus, the same effects as those of the light irradiation apparatus illustrated in FIGS. 11 and 12 can be obtained.

In this light irradiation apparatus, the center axes L of the sealing lenses 22 are located within a plane closer to the lens reference plane S than the light source reference plane F is. The light traveling from the light emitting elements 25 along the light source reference plane F and part of the light traveling in directions away from the lens reference plane S with respect to the light source reference plane F are therefore refracted at the surfaces of the sealing lenses 22 into directions from the light source reference plane F toward the lens reference plane S. This can reduce the amount of light blocked by the second holder 15 among the rays of light radiated from the light source unit 20. The use efficiency of the light can thus be improved.

Figure 17:
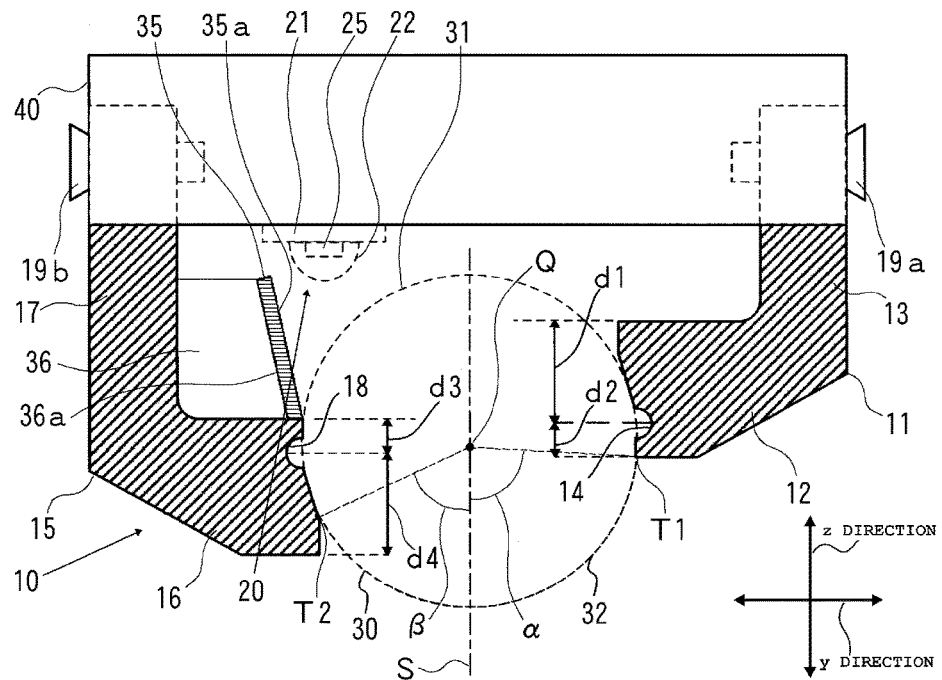
FIG. 17 is an explanatory diagram illustrating an internal configuration of a light irradiation apparatus according to a fourth embodiment of the second invention.

FIG. 17 is an explanatory diagram illustrating an internal configuration of a light irradiation apparatus according to a fourth embodiment of the second invention. In this light irradiation apparatus, a reflecting mirror 35 extending in the x direction (direction perpendicular to the plane of FIG. 17) is arranged along the longitudinal direction of the cylindrical lens 30 on the other side of the cylindrical lens 30 with respect to the lens reference plane S. This reflecting mirror 35 is disposed so that its reflecting surface 35a is opposed to the cylindrical lens 30 to receive and reflect light from the light source unit 20 to the one side of the lens reference plane S via the cylindrical lens 30.

To be more specific, a support base 36 that extends in the x direction and has a columnar shape with a generally trapezoidal cross section is disposed along the longitudinal direction of the second holder 15 on the surface of the second holder 15 opposed to the light source unit 20. A surface of this support base 36 opposed to the cylindrical lens 30 serves as a support surface 36a for supporting the reflecting mirror 35. This support surface 36a is obliquely formed with respect to the lens reference plane S so that the support surface 36a is closer to the lens reference plane S on the side of the sandwiching portion 16 of the second holder 15 than on the side of the light source 20. Furthermore, the reflecting mirror 35 is supported with its back surface in contact with the support surface 36a of the support base 36. The reflecting surface 35a of the reflecting mirror 35 is thereby disposed to be opposed to the cylindrical lens 30 in a state of being tilted with respect to the lens reference plane S so that the reflecting surface 35a is closer to the lens reference plane S on the side of the sandwiching portion 16 of the second holder 15 than on the side of the light source unit 20. In the illustrated example, the reflecting mirror 35 is disposed so that one side rim of the reflecting surface 35a extending in the x direction is in contact with the outer peripheral surface of the cylindrical lens 30.

The reflecting mirror 35 may be a metal multilayer film formed by deposition or the like on the surface of a substrate made of aluminum.

The rest of the configuration of this light irradiation apparatus is the same as that of the light irradiation apparatus illustrated in FIGS. 11 and 12.

According to such a light irradiation apparatus, the same effects as those of the light irradiation apparatus illustrated in FIGS. 11 and 12 can be obtained.

In this light irradiation apparatus, the light traveling from the light emitting elements 25 in directions away from the lens reference plane S with respect to the light source reference plane F is reflected by the reflecting mirror 35 to the one side of the lens reference plane S via the cylindrical lens 30. This can reduce the amount of light blocked by the second holder 15 among the rays of light radiated from the light source unit 20. The use efficiency of the light can thus be improved.

Moreover, the projection of the light radiated from the light source unit 20 upon the second holder 15 can be suppressed. This can suppress an increase in the internal temperature of the light irradiation apparatus due to the light from the light source unit 20.

The light irradiation apparatus according to the second invention is not limited to the foregoing embodiments, and the following various modifications may be made thereto.

(1) The cylindrical lens 30 is not limited to the one having a circular cross section, and ones having various shapes may be used. The cylindrical lens 30 may preferably refract the light in directions away from the light source reference plane F at the light reception surface 31 and the light-exiting surface 32.

(2) The light source unit 20 may include two substrates 21 each extending in the x direction. A plurality of light emitting elements 25 may be disposed on the surface of each of the substrates 21 in a state of being arranged in the x direction along the surface of the substrate 21.

Figure 18:
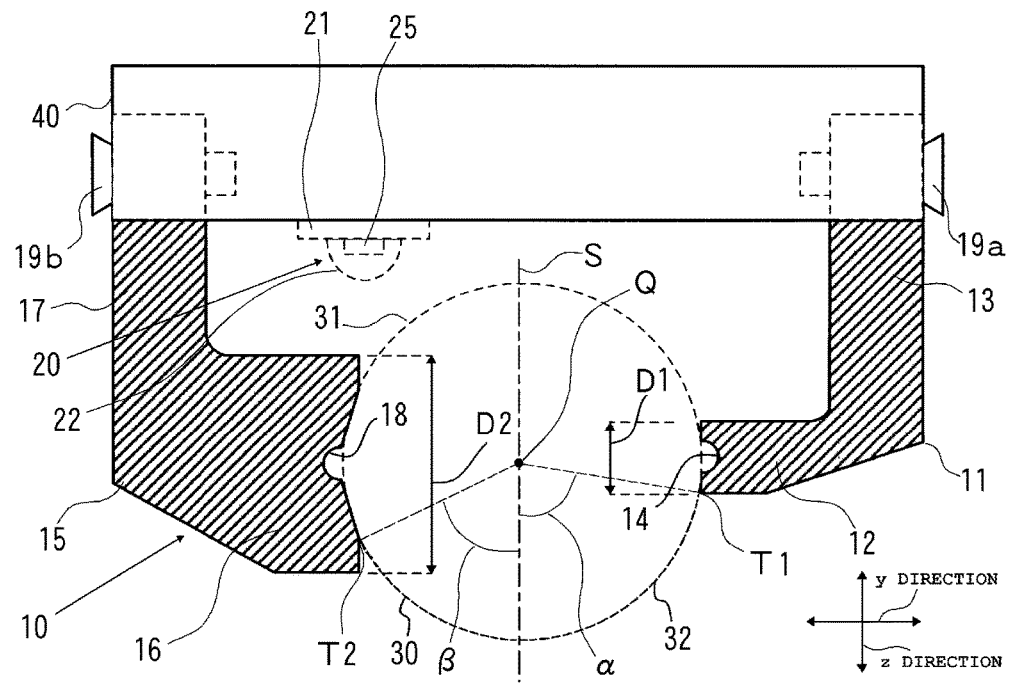
FIG. 18 is an explanatory diagram illustrating a modification of a lens holding mechanism of the light irradiation apparatus according to the second invention.

(3) The specific configuration of the first holder 11 and the second holder 15 is not limited to that illustrated in FIG. 13. For example, a configuration illustrated in FIG. 18 may be used. The first holder 11 and the second holder 15 illustrated in FIG. 18 have sandwiching portions 12 and 16 of mutually asymmetrical shapes. Specifically, the sandwiching portion 12 of the first holder 11 has a smaller thickness D1 in the z direction than a thickness D2 of the sandwiching portion 16 of the second holder 15 in the z direction. Grooves 14 and 18 extending in the x direction (direction perpendicular to the plane of FIG. 18) are formed in the contact surfaces of the sandwiching portions 12 and 16 of the first holder 11 and the second holder 15, each in the center position in the z direction.

Figure 19:
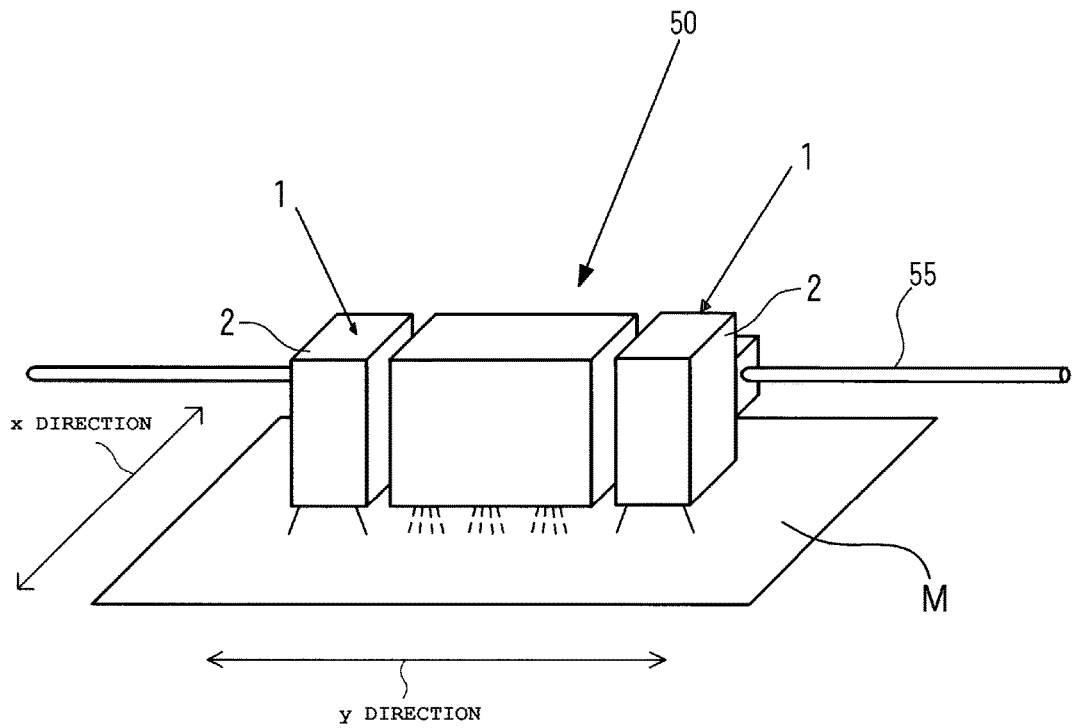
FIG. 19 is an explanatory diagram illustrating an overview of a configuration according to an example of a photocurable material treatment apparatus of the present invention.

Photocurable Material Treatment Apparatus:

FIG. 19 is an explanatory diagram illustrating an overview of a configuration according to an example of a photocurable material treatment apparatus of the present invention. This photocurable material treatment apparatus is configured as an inkjet printer, and includes a head unit 50 of rectangular solid shape including a plurality of discharge parts (not illustrated) for discharging ultraviolet-curable ink, which is a photocurable material, to a recording medium M. Light irradiation apparatuses 1 for irradiating the photocurable material discharged to the recording medium M with ultraviolet rays are disposed on respective sides of the head unit 50 so as to adjoin the head unit 50. The light irradiation apparatuses 1 are ones according to the foregoing first invention or second invention. A description will be given with reference to FIG. 2. Each of the light irradiation apparatuses 1 is disposed so that the light from the light-exiting surface 32 of the cylindrical lens 30 is projected on a position away from the head unit 50. Specifically, each of the light irradiation apparatuses 1 is disposed in an orientation such that the side surface of the housing 2 located on the other side of the lens reference plane S (see FIG. 2) is located close to the head unit 50. The head unit 50 and the light irradiation apparatuses 1 are supported to be movable in the y direction by a guide rail 55 extending in the y direction.

In this photocurable material treatment apparatus, the recording medium M is intermittently conveyed in the x direction by appropriate conveyance means (not illustrated). As the head unit 50 is moved in the y direction, the discharge parts of the head unit 50 discharge the ink toward the conveyed recording medium M. As a result, the ink adheres to the recording medium M. The light irradiation apparatuses 1 then irradiate the ink adhering to the recording medium M with the light, whereby the ink is cured and fixed to the recording medium M.

According to such a photocurable material treatment apparatus, the light from the light-exiting surface 32 of the cylindrical lens 30 in each of the light irradiation apparatuses 1 is projected on a position away from the head unit 50. This can prevent or suppress the irradiation of the discharge parts of the head unit 50 with the light. In addition, since the light irradiation apparatuses 1 do not need to be disposed away from the head unit 50, the entire photocurable material treatment apparatus can be miniaturized.

EXAMPLES

Example 1

A light irradiation apparatus having the following specification was manufactured according to the configuration illustrated in FIGS. 1 and 2, except that the sealing lenses were formed according to the configuration illustrated in FIG. 4.

The substrate of the light source unit is made of aluminum nitride, with dimensions of 105 mm×20 mm×1.0 mm. The light emitting elements are light-emitting diodes with a peak wavelength of 395 nm, an output of 700 mW and dimensions of 1.0 mm×1.0 mm×0.1 mm. The number of light emitting elements is 25. The arrangement pitch is 4.0 mm. The sealing lenses are made of a silicone resin, with a radius of 1.1 mm. The sealing lenses are formed so that the separation distance between the center axis L and the light source reference plane F is 0.5 mm.

The cylindrical lens is made of quartz glass, with an overall length of 110 mm and a diameter of 10 mm. The cylindrical lens is disposed so that the separation distance between the light source reference plane F and the lens reference plane S is 5 mm, and the angle that the straight line connecting the center P of the light emission surface of a light emitting element and the center axis Q of the cylindrical lens in the shortest distance forms with the lens reference plane S is 45°. The first holder and the second holder are made of aluminum, with an overall length of 110 mm. The second holder is disposed so that its end portion on the side of the lens reference plane S in the y direction is located on the light source reference plane F.

Figure 20:
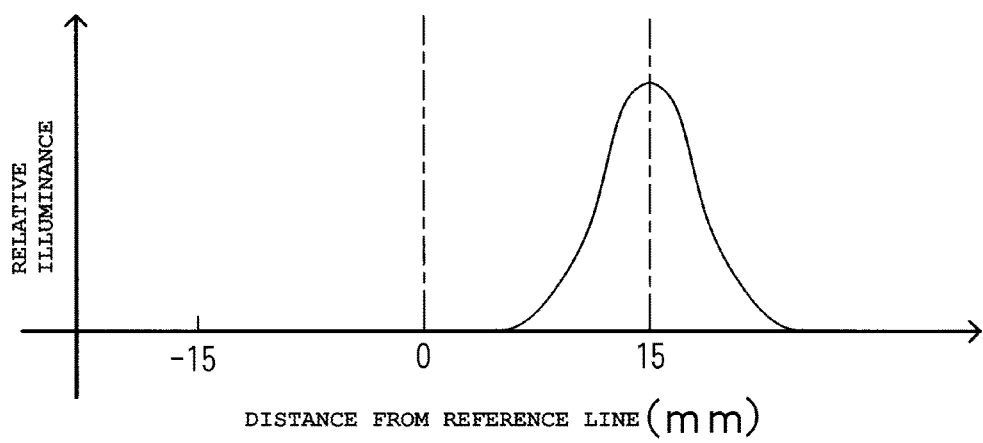
FIG. 20 is a graph illustrating an illuminance distribution of a light irradiation apparatus according to Example 1 in the y direction.

The light irradiation apparatus described above was used to irradiate a surface to be irradiated extending in the x direction and the y direction, separated from the cylindrical lens by 10 mm in the z direction, with light. An illuminance distribution on the surface to be irradiated in the y direction was measured. FIG. 20 illustrates the result.

In FIG. 20, the vertical axis represents relative illuminance. The horizontal axis represents the distance in the y direction from a reference line where the surface to be irradiated and the lens reference plane S intersect each other. The direction away from the light source reference plane is represented by positive values, and the opposite direction by negative values.

As is evident from the result illustrated in FIG. 20, according to the foregoing light irradiation apparatus, an irradiation area having an illuminance peak in a position 15 mm from the lens reference plane S in the direction opposite from the light source reference plane F is formed in the y direction of the surface to be irradiated. The illuminance on the area on the side of the light source reference plane F than the lens reference plane S in the y direction of the surface to be irradiated was confirmed to be substantially zero.

Consequently, according to the light irradiation apparatus described above, the direct or indirect light irradiation of other portions adjoining on the one side can be prevented or suppressed.

Example 2

A light irradiation apparatus having the following specification was fabricated according to the configuration illustrated in FIGS. 11 and 12, except that the sealing lenses were formed according to the configuration illustrated in FIG. 16.

The substrate of the light source unit is made of aluminum nitride, with dimensions of 105 mm×20 mm×1.0 mm. The light emitting elements are light-emitting diodes with a peak wavelength of 395 nm, an output of 700 mW and dimensions of 1.0 mm×1.0 mm×0.1 mm. The number of light emitting elements is 25. The arrangement pitch is 4.0 mm. The sealing lenses are made of a silicone resin, with a radius of 1.1 mm. The sealing lenses are formed so that the separation distance between the center axis L and the light source reference plane F is 0.5 mm.

The cylindrical lens is made of quartz glass, with an overall length of 110 mm and a diameter of 10 mm.

The first holder and the second holder are made of aluminum, with an overall length of 108 mm. The sandwiching units each have a thickness of 4 mm in the z direction. A groove having a semicircular cross section is formed in the contact surface of each sandwiching unit, with a radius of 0.5 mm. In the first holder, the thickness (d1) from the center position of the bottom of the groove in the direction away from the surface to be irradiated is 3 mm. The thickness (d2) from the center position of the bottom of the groove in the direction toward the surface to be irradiated is 1 mm. In the second holder, the thickness (d3) from the center position of the bottom of the groove in the direction away from the surface to be irradiated is 1 mm. The thickness (d4) from the center position of the bottom of the groove in the direction toward the surface to be irradiated is 3 mm.

The light source unit, the cylindrical lens and the lens holding mechanism are disposed in a positional relationship satisfying the following condition.

The separation distance between the light source reference plane F and the lens reference plane S is 5 mm. The angle that the straight line connecting the center P of the light emission surface of a light emitting element and the center axis Q of the cylindrical lens in the shortest distance forms with the lens reference plane S is 45°.

The second holder is disposed so that the position T2 is located on the light source reference plane F.

The angle α that the straight line connecting the position Q and the position T1 forms with the lens reference plane S is 85°. The angle β that the straight line connecting the position Q and the position T1 forms with the lens reference plane S is 50°.

Example 3

A light irradiation apparatus having the same specification as that of Example 2 was fabricated, except that a reflecting mirror was provided according to the configuration illustrated in FIG. 17.

The reflecting mirror of this light irradiation apparatus is a metal multilayer film formed by deposition or the like on the surface of a substrate made of aluminum. The reflecting mirror has dimensions of 108 mm×3.5 mm×0.5 mm. The reflecting mirror is disposed so that the one side rim of the reflecting surface extending in the x direction is in contact with the outer peripheral surface of the cylindrical lens, and the tilt angle of the reflecting surface to the lens reference plane S is 12.5°.

Reference Example 1

A light irradiation apparatus having the same specification as that of Example 2 was fabricated, except that the first holder was replaced with one having a configuration symmetrical to the second holder with respect to the lens reference surface S.

Figure 21:
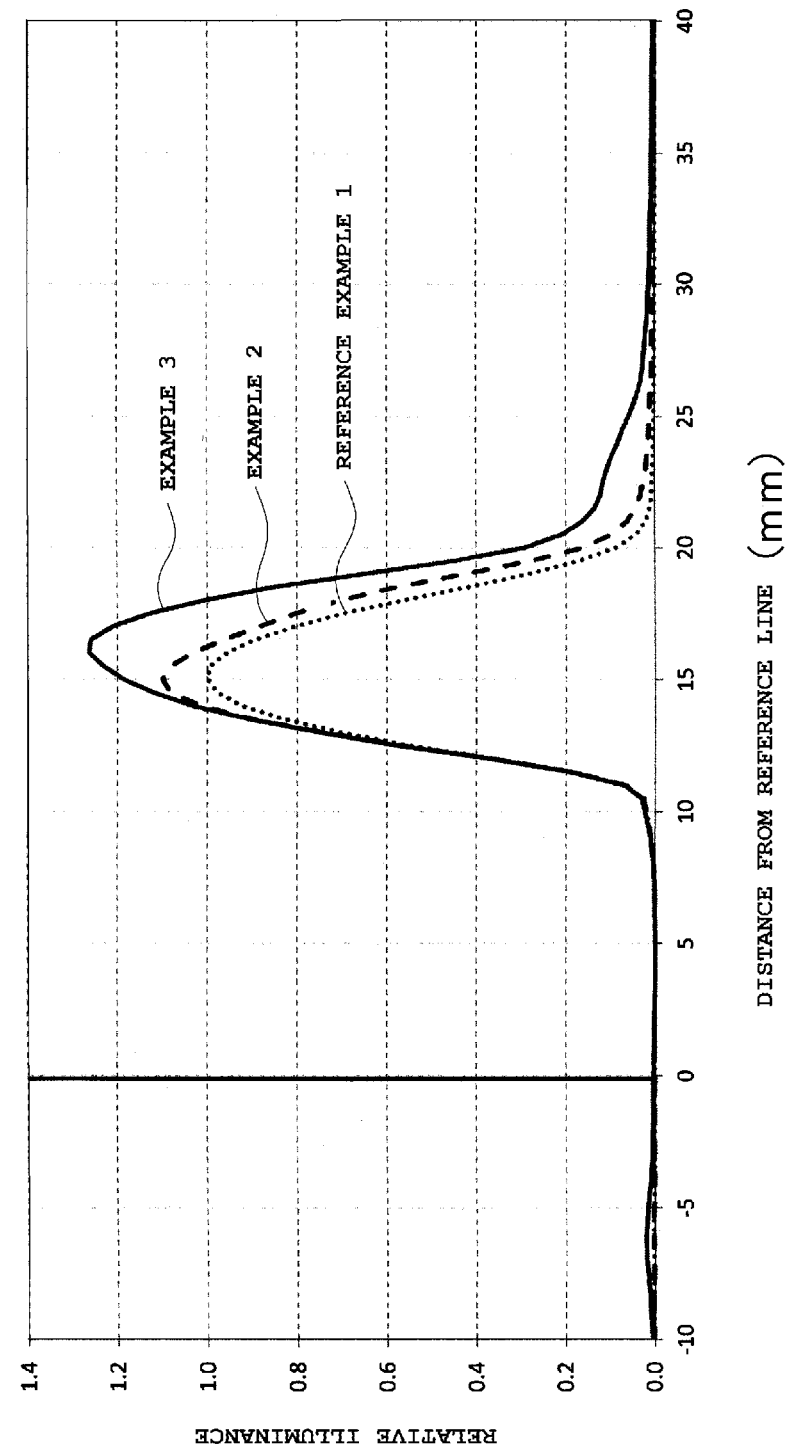
FIG. 21 is a graph illustrating illuminance distributions of light irradiation apparatuses according to Examples 2 and 3 and Reference Example 1.

Test 1:

The light irradiation apparatuses according to Examples 2 and 3 and Reference Example 1 were used to irradiate a surface to be irradiated extending in the x direction and the y direction, 5 mm away from the cylindrical lens in the z direction, with light. An illuminance distribution of the surface to be irradiated in they direction was measured. FIG. 21 illustrates the result.

In FIG. 21, the vertical axis represents relative illuminance, with the illuminance peak value of the light irradiation apparatus according to Reference Example 1 as 1. The horizontal axis represents the distance in the y direction from the reference line where the surface to be irradiated and the lens reference plane S intersect each other. The direction away from the lens reference plane S to the one side is represented by positive values. The direction away from the lens reference plane S to the other side is represented by negative values.

As is evident from the result illustrated in FIG. 21, according to the light irradiation apparatuses of Examples 2 and 3, an irradiation area having an illuminance peak in a position 15 mm to the one side from the lens reference plane S is formed. The illuminance on the area on the other side than the lens reference plane S in the y direction of the surface to be irradiated was confirmed to be substantially zero.

Consequently, according to the light irradiation apparatuses of Examples 2 and 3, the direct or indirect light irradiation of other portions adjoining on the other side of the lens reference plane S can be prevented or suppressed.

The light irradiation apparatus according to Example 3 was confirmed to provide high illuminance in the irradiation area away to the one side from the lens reference plane S in the y direction of the surface to be irradiated, compared with the light irradiation apparatus according to Reference Example 1.

The value of the maximum illuminance provided by the light irradiation apparatus according to Example 2 was 1.1 times that of the maximum illuminance provided by the light irradiation apparatus according to Reference Example 1. The value of the maximum illuminance provided by the light irradiation apparatus according to Example 3 was 1.26 times that of the maximum illuminance provided by the light irradiation apparatus according to Reference Example 1.

Test 2:

The following test was performed on the light irradiation apparatuses according to Examples 2 and 3 and Reference Example 1.

The surface to be irradiated extending in the x direction and the y direction, 5 mm away from a light irradiation apparatus, was irradiated with light from the light irradiation apparatus while the positional relation between the light irradiation apparatus and the surface to be irradiated was relatively changed in the y direction at a rate of 100 mm/sec. The cumulative amount of light of each light irradiation apparatus on the surface to be irradiated was measured.

As a result, the value of the cumulative amount of light of the light irradiation apparatus according to Example 2 was 1.156 times that of the cumulative amount of light of the light irradiation apparatus according to Reference Example 1. The value of the cumulative amount of light of the light irradiation apparatus according to Example 3 was 1.51 times that of the cumulative amount of light of the light irradiation apparatus according to Reference Example 1.

From the foregoing, the light irradiation apparatus according to Example 3 was confirmed to have a high use efficiency of light, compared with the light irradiation apparatus according to Reference Example 1. The light irradiation apparatus according to Example 3 was also confirmed to have a high use efficiency of light, compared with the light irradiation apparatus according to Example 2.

REFERENCE SIGNS LIST 1 light irradiation apparatus
2 housing
10 lens holding mechanism
11 first holder
11a, 11b holding member
12, 12a, 12b sandwiching portion
13, 13a, 13b portion to be supported
14, 14b groove
15 second holder
16 sandwiching portion
17 portion to be supported
18 groove
19a, 19b, 19c, 19d bolt
20 light source unit
21 substrate
22 sealing lens
25 light emitting element
26 light shield
27 light reflection member
28 light absorption member
30 cylindrical lens
31 light reception surface
32 light-exiting surface
35 reflecting mirror
35a reflecting surface
36 support base
36a support surface
40 heat sink
41 fin
45 cooling fan
50 head unit
55 guide rail
F, F1, F2 light source reference plane
L center axis of the sealing lens
M recording medium
P center of the light emission surface of a light emitting element
Q center axis of the cylindrical lens
S lens reference plane
W surface to be irradiated

The invention claimed is:

1. A light irradiation apparatus comprising, with three mutually orthogonal directions as an x direction, a y direction and a z direction:
  a long light source unit in which a plurality of light emitting elements are disposed in a state of being arranged in the x direction along a plane extending in the x direction and the y direction; and
  a cylindrical lens that has an elongated shape extending in the x direction along the light source unit, a longitudinal peripheral surface of the cylindrical lens including a light reception surface for receiving light from the light source unit and a light-exiting surface for allowing the received light to exit therethrough, wherein
  the light source unit is disposed so that a light source reference plane extending in the z direction through a center of a light emission surface of each of the light emitting elements is positioned a spaced distance in the y direction from a lens reference plane extending in the x direction and extending in the z direction through a center axis of the cylindrical lens, the light source reference plane oriented to being parallel to the lens reference plane, and a direction of light from the light-exiting surface of the cylindrical lens that travels directly from the light reception surface to the light-exiting surface of the cylindrical lens is tilted in a direction away from the light source reference plane that is also a direction opposite to a direction from the lens reference plane to the light source reference plane.

2. The light irradiation apparatus according to claim 1, wherein a light shield that blocks the light from the light source unit is arranged in an area opposite from the lens reference plane with respect to the light source reference plane.

3. The light irradiation apparatus according to claim 2, wherein an end portion of the light shield positioned on a side of the lens reference plane is located in the light source reference plane or a plane positioned between the light source reference plane and the lens reference plane.

4. The light irradiation apparatus according to claim 1, wherein each of the light emitting elements of the light source unit is provided with a sealing lens of semispherical shape that covers the light emission surface of the light emitting element, and center axes of the sealing lenses are located in a plane parallel to the light source reference plane and parallel to the lens reference plane that is positioned between the light source reference plane and the lens reference plane.

5. A photocurable material treatment apparatus comprising: a head unit that includes a discharge part for discharging a photocurable material; and the light irradiation apparatus according to claim 1 that is arranged next to the head unit, wherein the light irradiation apparatus is disposed so that the light from the light-exiting surface of the cylindrical lens is projected on a position away from the head unit.

6. A light irradiation apparatus comprising, with three mutually orthogonal directions as an x direction, a y direction and a z direction:

a long light source unit in which a plurality of light emitting elements are disposed in a state of being arranged in the x direction along a first plane extending in the x direction and the y direction;

a cylindrical lens that has an elongated shape extending in the x direction along the light source unit, a longitudinal peripheral surface of the cylindrical lens including a light reception surface for receiving light from the light source unit and a light-exiting surface for allowing the received light to exit therethrough; and a lens holding mechanism that includes a first holder and a second holder, and sandwiches the cylindrical lens between the first holder and the second holder, the light irradiation apparatus irradiating a surface to be irradiated extending in the x direction and the y direction with the light from the light-exiting surface of the cylindrical lens, wherein with a second plane that includes a center axis of the cylindrical lens and extends in the x direction and the z direction to be perpendicular to the first plane as a lens reference plane, the first holder is arranged to make contact with a peripheral surface area of the cylindrical lens on a first side of the lens reference plane, and the second holder is arranged to make contact with the peripheral surface area of the cylindrical lens on a second side of the lens reference plane that is opposite from the first side, and in a cross section perpendicular to a longitudinal direction of the cylindrical lens, the first holder is disposed so that a first angle that a straight line connecting a first position and a second position forms with the lens reference plane is greater than a second angle that a straight line connecting the first position and a third position forms with the lens reference plane, where the first position is a position of the center axis of the cylindrical lens, the second position is a position closest to the surface to be irradiated in the peripheral surface area of the cylindrical lens with which the first holder makes contact, and the third position is a position closest to the surface to be irradiated in the peripheral surface area of the cylindrical lens with which the second holder makes contact.

7. The light irradiation apparatus according to claim 6, wherein centers of light emission surfaces of the light emitting elements in the light source unit are disposed on the second side of the lens reference plane.

8. The light irradiation apparatus according to claim 7, wherein a reflecting mirror that receives and reflects the light from the light source unit via the cylindrical lens is arranged on the second side of the lens reference plane, along the longitudinal direction of the cylindrical lens.

9. The light irradiation apparatus according to claim 6, wherein the first holder makes contact with a longitudinal end portion of the cylindrical lens.

10. The light irradiation apparatus according to claim 6, wherein the first holder and the second holder each include a sandwiching portion that makes contact with the cylindrical lens, and a portion to be supported that is connected to the sandwiching portion and extends in the x direction, and have a cantilever structure of being supported at one end of the portion to be supported.

11. A light irradiation apparatus comprising, with three mutually orthogonal directions as an x direction, a y direction and a z direction:

a long light source unit in which a plurality of light emitting elements are disposed in a state of being arranged in the x direction along a plane extending in the x direction and the y direction; and a cylindrical lens that has an elongated shape extending in the x direction along the light source unit, a longitudinal peripheral surface of the cylindrical lens including a light reception surface for receiving light from the light source unit and a light-exiting surface for allowing the received light to exit therethrough, wherein with a plane that includes a center of a light emission surface of each of the light emitting elements and extends in the x direction and the z direction as a light source reference plane, and a plane that includes a center axis of the cylindrical lens and extends in the x direction and the z direction as a lens reference plane, the light source unit is disposed so that the light source reference plane is located on a plane separated from the lens reference plane in the y direction, a direction of light from the light-exiting surface of the cylindrical lens is tilted in a direction away from the light source reference plane with respect to the lens reference plane, and a light shield that blocks the light from the light source unit is arranged in an area opposite from the lens reference plane with respect to the light source reference plane, wherein an end portion of the light shield positioned on a side of the lens reference plane is located in the light source reference plane or a plane positioned between the light source reference plane and the lens reference plane.

* * * * *